United States Patent Office 3,428,528
Patented Feb. 18, 1969

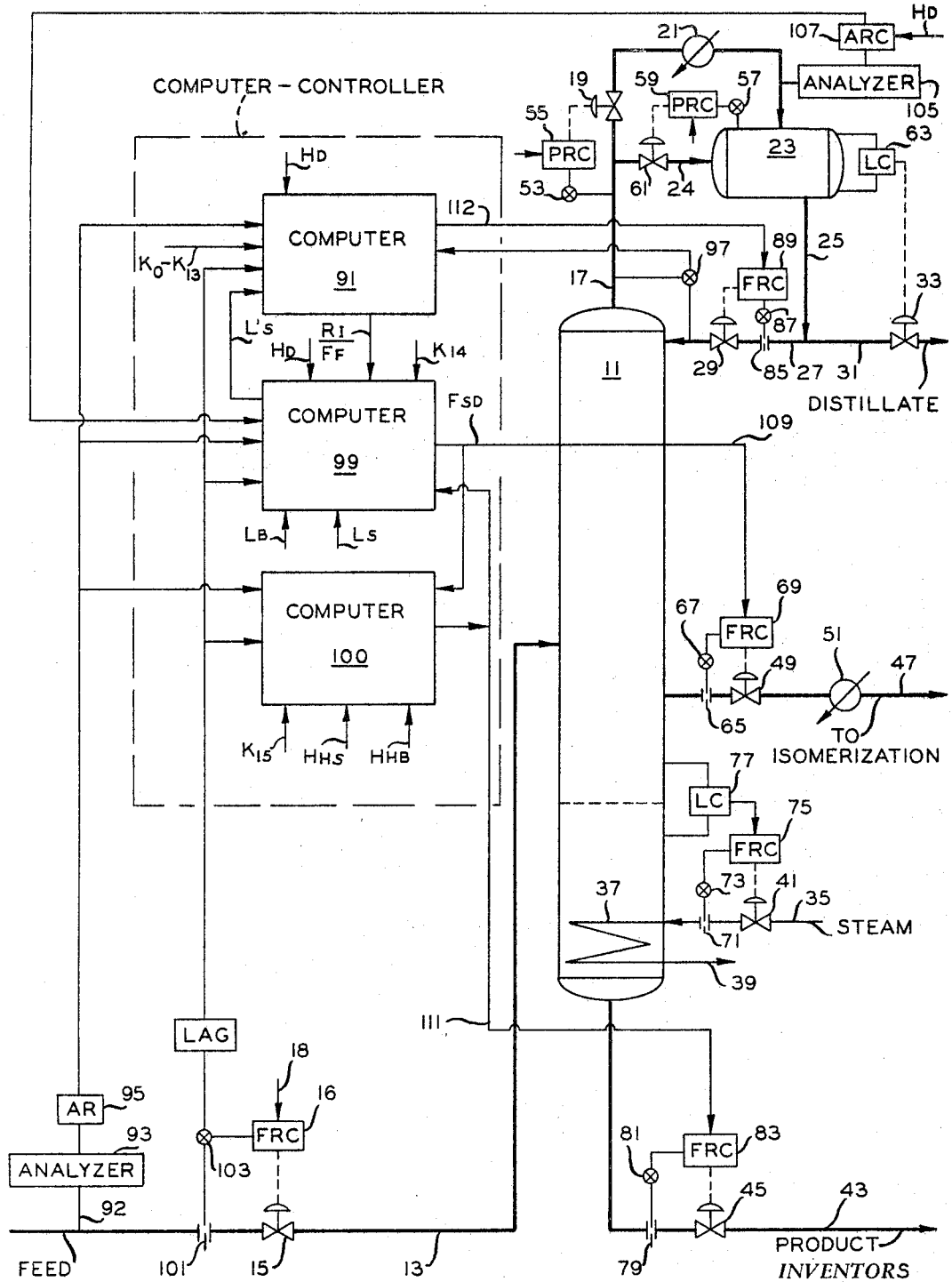

3,428,528
FRACTIONATION DISTILLATION CONTROL PROCESS AND APPARATUS WITH SIDE STREAM, REFLUX AND BOTTOMS FLOW CONTROL
Minor W. Oglesby, Jr., Bartlesville, Okla., and Robert M. Keeler, Corpus Christi, Tex., assignors to Phillips Petroleum Company, a corporation of Delaware
Filed Nov. 29, 1965, Ser. No. 510,277
U.S. Cl. 203—1          10 Claims
Int. Cl. B01d 3/42

ABSTRACT OF THE DISCLOSURE

In a fractionation system having an overhead product, a sidedraw product and a bottom product, the flow rate of each of the external reflux, the sidedraw product stream and the bottom product stream is manipulated by a respective output of a computer control system. The inputs to the computer control system include the feed flow rate, feed component concentrations, and desired component concentrations in each of the three product streams. The computer control system performs the simultaneous solution of three interrelated predictive equations to obtain the three flow control signals.

---

This invention relates to a method and apparatus for controlling the operation of a fractionation column. In one aspect this invention relates to a method for applying a predictive control system to a fractionation column which has at least three product streams. In another aspect this invention relates to a method for simultaneously controlling the flow rate of an overhead stream, a bottom stream and a sidedraw stream in order for the column to produce products of desired specifications in all three streams. In still another aspect, it relates to a method and means for controlling the operation of a fractionation column by an improved control system which automatically manipulates reflux flow rate, bottom product flow rate and side stream flow rate to maintain the operation of the column at optimum levels and produce products with specified purities.

There is ever-increasing activity in the art of fractional distillation to optimize the operation of a fractionation column so that products with desired specifications can be produced for minimum operating costs at the column's optimum design value. Optimizing the operation of a fractionation column is complicated and difficult because of the column's numerous degrees of freedom which are characterized as independent input variables, some of which are controllable (e.g., feed temperature and reboiler heat flow) and others of which are uncontrollable (e.g., ambient temperature and feed composition). Many methods and means have been proposed, patented or used in an effort to reduce the column's degrees of freedom.

In a copending application Ser. No. 189,375, now U.S. Patent 3,296,097 (assigned to a common assignee, Phillips Petroleum Company of Bartlesville, Okla.), Lupfer and Johnson describe a method and apparatus for controlling the flow rates of the reflux stream and the bottom stream to produce products with specified purities. In order to control the operation of such a column, it was found desirable to predictively calculate desired values of the flow rates of one product stream and the reflux and manipulate the column's operation thereby. In the subject environment, the fractionating column consists of three product streams. In order to control the operation of such a column, it is desirable to predictively calculate and control the flow rate of two of the three terminal streams in addition to the reflux flow rate.

One of the most important input variables of a fractionation column is reflux flow rate. In striving for optimum operation, this variable must be manipulated, particularly where there occur disturbances in certain uncontrollable input variables, such as ambient temperature, flow rate and temperature of heat exchange medium, and feed composition. The subject invention is particularly concerned with this variable (reflux flow rate) in order to maintain the specified operation of the column at optimum levels. Bottom product and sidedraw flow rates are important output variables which must be manipulated to compensate for disturbances in such variables as feed composition and feed flow.

Accordingly, one object of this invention is to provide improved control of the operation of a fractionation column which has a sidedraw stream.

Another object is to provide a method and means for manipulating the flow rates of the overhead reflux stream, the bottom product stream and the sidedraw stream in order to produce products with desired purities.

Yet another object is to provide a method and means for automatically manipulating the bottom flow rate in order to prevent an increase in the concentration of the heavier than heavy key component in the sidedraw stream.

A still further object is to provide a novel control system for operating a fractionation column, having a sidedraw stream therein, at maximum efficiency, notwithstanding changes in feed composition and feed flow rate, so as to produce products with minimum specified purities at minimum operating costs and at the maximum throughput of the column.

Other objects, advantages, and features of our invention will be apparent to those skilled in the art without departing from the scope and spirit of this invention, and it should be understood that the latter is not necessarily limited to the aforementioned discussion and accompanying drawing:

Wherein the sole figure is a block diagram of a fractionation unit in combination with a computer for controlling and optimizing the magnitude of a number of process variables.

To provide a setting or background for the subject invention, there will be described in brief fashion a conventional fractionation column as illustrated in the drawing.

A conventional fractional distillation column is represented as 11, which can be provided with a plurality of vertically spaced liquid-vapor contact trays (not shown). Feed comprising a multi-component mixture to be separated is supplied via line 13 and introduced onto a feed tray in column 11 located at an intermediate level therein, the flow rate of the feed being controlled by valve 15. Vapors are removed from the top of column 11 through overhead line 17, the flow rate being controlled by valve 19 and passed through a cooler 21 such as an air-cooled condenser, the resulting liquid being passed to an accumulator 23. Liquid distillate in accumulator 23 is withdrawn via line 25, and a portion of this withdrawn liquid is recycled via line 27 as external reflux to the top of column 11, the flow rate of the external reflux being controlled by valve 29. The balance of the liquid distillate withdrawn from accumulator 23 is removed from the system through line 31 and yielded as distillate product, the flow rate being controlled by valve 33.

Heat is supplied to the kettle of column 11 by circulation of steam or other heat exchange medium from supply line 35 through reboiler coil 37. The cooled heat exchange medium is withdrawn from the coil via line 39. The flow rate of the heat exchange medium in line 35 is controlled by valve 41. Bottom product is withdrawn from the kettle of column 11 via line 43, the flow rate of the bottom product being controlled by valve 45.

A fluid sidestream is removed from an intermediate level within column 11 via conduit 47, the flow rate being controlled by valve 49 and passed through a cooler 51 such as an air-cooled heat exchanger, the resulting liquid being removed to another chemical or physical processing unit (not shown).

Thus far, there has been described a conventional fractionation column employing a sidedraw product stream in addition to the usual product streams, which by itself does not constitute the subject invention. The object of the fractionation column, of course, is to separate the multi-component feed into at least three fractions, an overhead, a sidedraw, and a bottom product. The light (lower boiling) components of the feed will appear mainly in the overhead product and the heavy (higher boiling) components of the feed will appear mainly in the sidedraw and in the bottom product since, in this example, the sidedraw is located below the feed tray. The light components will comprise a light key component and components lighter than the light key component, while the heavy components will comprise a heavy key component and components heavier than the heavy key component. The heavy key component will appear mainly in the sidedraw stream and the bottom stream, and the heavier than heavy key components will appear in the bottom product stream in greater concentration than in the sidedraw stream, while the light and lighter than light key components will appear mainly in the overhead stream. Since perfect separation between components adjacent in volatilities is impossible by fractional distillation, some of the heavy key component will appear as an impurity in the overhead and some of the light key component will appear as an impurity in the sidedraw stream and also in the bottom stream. The heavier than heavy key component will also appear as an impurity in the sidestream. However, the concentrations of these impurities can be kept down to desired levels by proper operation of the column. The operation of a distillation column of this type can be specified by assigning predetermined values to the fraction ($H_D$) of the heavy key component desired in the overhead (or distillate) product, and the ratio of the heavy key component to the heavier than heavy key component ($H_S$ to $H_{HS}$) desired in the sidedraw stream. If these specifications are to be met at minimum operating costs and at maximum utilization of the column, corrective actions must be taken at the proper time and rate to minimize both the transient and steady state effects of disturbances on product compositions and flows.

A fractionation column has numerous degrees of freedom and any significant step in the control of the operation of a fractionation column must reduce these degrees of freedom. The degrees of freedom of column 11 can be reduced by providing it with minimum controls well known in the art. For instance, a constant pressure in the top of column 11 can be maintained by an assembly comprising a pressure transducer 53, and a pressure recorder controller 55 in conjunction with control valve 19. A constant pressure is maintained in accumulator 23 by passing some of the overhead vapor from line 17 to accumulator 23 via bypass line 24, the pressure being regulated by an assembly comprising pressure transducer 57, and pressure recorder controller 59 in conjunction with flow control valve 61.

The flow rate of feed to column 11 via line 13 can be controlled by an assembly comprising a flow measuring element 101, flow transducer 103 and flow recorder controller 16 in conjunction with flow control valve 15.

The flow rate in the distillate product line 31 can be controlled by an assembly comprising a liquid level controller 63 associated with accumulator 23 in conjunction with control valve 33 so as to maintain a constant liquid level in the accumulator.

The flow rate of the sidedraw stream can be controlled by an assembly comprising flow measuring element 65, flow transducer 67 and flow recorder controller 69 in conjunction with flow control valve 49.

The flow rate of reboiling steam in line 35 can be controlled by an assembly comprising flow measuring element 71, flow transducer 73 and flow recorder controller 75 in conjunction with control valve 41, the set point of flow recorder controller 75 being manipulated by or in a cascaded relationship with liquid level controller 77 associated with the kettle of column 11 so as to maintain a constant liquid level in the kettle. Thereby, the level of the boiling liquid in the kettle of column 11 is used to manipulate the flow rate of steam passed via line 35 to the reboiler.

The flow rate of bottom product in line 43 can be controlled by an assembly comprising flow measuring element 79, flow transducer 81 and flow controller 83 in conjunction with flow control valve 45.

The external reflux flow rate can be controlled by an assembly comprising flow measuring element 85, flow transducer 87, and flow controller 89 in conjunction with flow control valve 29.

These control features are all known in the prior art as effective means for reducing the degrees of freedom of the column and as such by itself does not constitute the inventive improvement. There are many other input variables affecting the operation of the column and it is the improved control of these variables that enables the column to be operated more efficiently.

An input variable of primary concern in this invention is the reflux flow rate. Uncontrolled fluctuations in this variable can affect purity and operation cost. But in speaking about reflux flow rate, it is necessary to distinguish between external reflux flow rate and internal reflux flow rate. The external reflux flow rate is the flow rate of liquid returned to the top of the column, i.e., the flow rate of liquid in line 27 controlled by valve 29. The internal reflux flow rate is the flow rate of liquid descending from the top tray of column 11 toward the bottom of the column. It is the sum of the external reflux flow rate plus the flow rate of that liquid which results from the condensation of vapors upon contact with the cool external reflux on the top tray of the column. Holding the flow rate of the external reflux constant offers no guarantee that the internal reflux will remain constant if the differential temperature between the vapors and the external reflux is variable. Thus, for precise operation, it is the internal reflux flow rate which must be maintained at the desired value. Unfortunately, it is difficult to measure directly the actual flow of internal reflux because it is undesirable to install primary flow measuring devices within the column.

Fluctuations or changes in the temperature of the external reflux and in the composition of the feed and thereby that of liquid within the column exert an effect on the liquid-vapor heat and mass transfer taking place inside the column. For any external reflux temperature and feed composition there will be a certain internal reflux flow rate required to make a specified separation. Variations in the temperature of the external reflux are usually due to fluctuations in ambient temperature. This is especially true when air-cooled condensers are used to condense the overhead vapors of the column. Ambient temperature changes, for example due to sudden rain storms or drop in temperatures at night, produce changes in the temperature of the external reflux liquid being returned to the top of the column. These temperature variations affect the internal reflux flow rate in the column. For example, if the external reflux temperature drops, this means that more of the vapors passing through the top tray of the column will be condensed, resulting in a decrease in overhead product yield and an increase in bottoms product yield (if the external reflux flow is held constant), which in turn produces an unnecessary increase in the purity of the overhead product and an undesirable decrease in bottoms product purity.

There will now be described how, according to the subject invention, the internal reflux flow rate to a distillation column needed to produce products of specified composition can be predicted and how this value can be employed to maintain the external reflux flow rate at its corresponding desired value and how the sidedraw and the bottom flow rates can be predicted and employed so that distillate, sidedraw and bottom products of specified purities can be produced.

Briefly, measurements are made of feed flow rate and feed composition, signals are produced representative of such measurements and these signals are combined with other signals proportional to certain constants in a predictive, statistically-derived equation based on the expression:

$$\frac{R_I}{F_F} = K_0 + K_1 L_{LF} + L_F[K_2 + K_3 e^{K_4 L's} + K_6 e^{K_7 H_D} + K_5(L_F)] + K_8 e^{K_4 L's} + K_9 e^{K_7 H_D} + K_{10} e^{K_7 H_D} e^{K_4 L's} + K_{11}(R_I) + K_{12}(R_I)^2 \quad (I)$$

$R_I$ = internal reflux flow rate (volume per unit time), desired.
$F_F$ = feed flow rate (volume per unit time), measured.
$L_{LF}$ = liquid volume fraction of lighter than light key component in feed.
$L'_s$ = specified liquid volume fraction of light key component in combined bottom and sidedraw streams.
$e$ = natural base logarithm.
$H_D$ = specified liquid volume fraction of heavy key in overhead product.
$L_F$ = liquid volume fraction of light key component in feed.
$K_0$–$K_{12}$ = constants which are statistically derived as will be explained hereinbelow.

A signal proportional to the predicted ratio of internal reflux flow rate to feed flow rate can be recorded and used for monitoring purposes only but preferably such signal is applied in a feed-forward manner as a set point adjusting signal to adjust the set points of one or several downstream process variable controllers such as the flow rate controller used to manipulate external reflux flow rate. This predictive correction action compensates for changes in feed composition and feed flow rate, and the corrective action is taken at the proper rate and time to minimize the effect of such changes on the desired product purities. The system used to make this corrective action is called a predictive or feed-forward control system.

The predictive equations are determined by straightforward well-known statistical methodology to determine the mathematical relationship between the significant variables, i.e. feed flow rate, feed composition, sidedraw flow rate, bottoms flow rate, desired product purities, and the like, and the columns operating parameters. One means of developing such equations is the response surface experiment or empirical study, wherein the approximate value of internal reflux is found on the basis of the independent variables. This empirical study of internal reflux will be adequate when the ranges of the independent variables are predetermined, and when the effects of other factors are known to be insignificant or constant. The procedure for determining the response surface is straightforward. For this purpose, the Box-Wilson central composite designs will be quite useful since they will determine the curvature in the response surface in the region of interest. These designs provide data for estimating linear, quadratic, and two-factor interaction effects by measuring each variable at five different levels, and, where plant data is used rather than theoretical data, repeating a single observation several times in order to estimate the nonreproducibility of the measurements. When the functional relationship between internal reflux and the independent variables has thus been determined, it then is necessary to determine the coefficients in the predictive equation. One common method of analysis which can be used to determine these coefficients (values for $K_0$–$K_{12}$) is called regression analysis. Regression analysis assumes a relationship between the dependent variable, internal reflux, and each term in the proposed equation, and determines the best set of coefficients for the predictive equation. The criterion for calculating the best set of constants for the equation is Gauss' familiar principle of least squares, and it determines the percent of the variation in internal reflux that is explained by the equation, and establishes the precision of the equation in terms of Standard Error of Estimate.

The following summarizes the statistical approach in deriving a predictive equation for setting forth the values for the K's in the above-identified equation.

(1) Select all independent variables believed to exert a significant effect upon internal reflux;

(2) Design and carry out screening experiments to test for the significant effects of the independent variables;

(3) Perform a correlation analysis to identify variables which should be represented in a predictive equation;

(4) Perform a surface response experiment either on the actual operating column or by tray to tray calculations (e.g. on a digital computer) to obtain data, using a suitable experimental design for data gathering, such as the Box-Wilson composite design; and (5) Using regression analysis, determine the best set of coefficients for an assumed form of the predictive equation and determine the precision of the equation in terms of Coefficient of Determination and Standard Error of Estimate.

Those skilled in the art of statistics will be able to determine $K_0$–$K_{12}$ values for a particular equation for internal reflux for any distillation column in view of the foregoing discussion.

A computing zone 91 automatically solves Equation I for a predicted value of internal reflux-to-feed flow ratio. This zone 91 is associated with an analyzer 93, the latter being in communication with feed line 13 by reason of a sampling line 92. Analyzer 93 comprises any suitable instrument which continuously or substantially continuously (i.e., rapid cycle) analyzes the feed and determines the relative amounts, e.g., liquid volume percent, of the components in the feed which function as independent variables in the predictive Equation I, and produces signals representative thereto. Analyzer 93 is one such as is described in I.S.A. Journal, vol. 5, No. 10, p. 20, October 1958, which preferably comprises a high speed chromatographic analyzer having a programmer, sampling valve, chromatographic column, detector, and peak reader, the latter functioning to read the peak height of the components, giving an equivalent output signal which is suitable for computation and control purposes. In operation, sample flows continuously through the analyzer. At a signal from the programmer, a measured volume of sample is flushed into the chromatographic column. When the components of the sample arrive sequentially at the detector, the resulting signals are measured, amplified, and stored until, on the next signal, the sequence is repeated. The stored signals are continuous output signals analogous to the concentrations of the components present. An analyzer recorder 95 records these output signals from analyzer 93 and feeds signals which represent volume percents of the light key and the lighter than light key components in the feed, passing through line 13, to computing zone 91. Differential thermocouple transmitter 97 detects the difference in temperature between the external reflux in line 27 and the overhead vapor in line 17; this transducer then transmits a signal which is representative of this temperature ($\Delta T$) difference to computing zone 91. A flow measuring element 101 located in line 13 in conjunction with flow transmitter 103 sends a signal to computing zone 91 representative of the rate of flow of feed. A second computing zone 99 calculates the $L'_s$ value and feeds a signal representative of this value to computing zone 91.

The desired concentration of heavy key component in the distillate ($H_D$) as well as the reflux computer constants $K_0$ through $K_{13}$ determined as discussed hereinabove are inserted into computing zone 91 by conventional means. This computing zone solves Equation I producing a signal which represents a predicted value of $R_I/F_F$, from which it produces a value representative of the desired external reflux flow rate by solving the following equation:

$$R_E = \left[ \frac{\left(\frac{R_I}{F_F}\right)(F_F)}{1 + K_{13}\Delta T} \right] \frac{e^{-ST}}{(TS+1)^2} \quad \text{(II)}$$

$K_{13} = C_p/\lambda$.
$C_p$ = specific heat of said external reflux stream.
$\lambda$ = heat of vaporization of liquid on the top tray of said column.
$e^{-ST}/(TS+1)^2$ = this expression will be defined hereinafter.

This signal is transmitted via signal line 112 to flow controller 89 wherein the signal is compared with a signal representative of the actual flow rate in the reflux line 27. If the desired external reflux flow rate $R_E$ is larger than the measured external reflux rate, flow controller 89 accordingly will increase the flow rate of the external reflux flowing in line 27 by further opening flow control valve 29. Conversely, if the desired external reflux flow rate $R_E$ is less than the measured external reflux flow rate, flow controller 89 will accordingly decrease the flow rate of external reflux in line 27 by decreasing the extent to which flow control valve 29 is open.

The predicted ratio $R_I/F_F$ computed in computing zone 91 is transmitted to a second computing zone 99 as an input signal thereto.

This second computing zone also receives a signal representative of the flow rate of the feed in line 13 from flow transmitter 103. The liquid in line 17 after condenser 21 is analyzed by analyzer 105 which can be similar in construction to analyzer 93. This analyzer analyzes the condensed overhead vapor and determines the relative amounts, e.g. liquid volume percents of the components of interest in the distillate, in particular, the concentration of the heavy key component in the overhead, e.g. liquid volume percent, in the same manner that the analyzer analyzed all the components in the feed sample from line 13. This analyzer then sends a signal representative of the concentration of the heavy key component to the analyzer recorder controller 107. The specified liquid volume percent of the heavy key component desired ($H_D$) in the distillate is introduced as a set point to the analyzer recorder controller where it is compared with the measured liquid volume percent of heavy key component present in the distillate. In relation to any difference between the measured heavy key concentration in the distillate and $H_D$, controller 107 transmits a signal $\theta_0$ to computer 99. $\theta_0$ is the output signal from the analyzer controller 107 which is related to the difference between the measured volume percent and the desired volume percent of the heavy key component in the distillate. $K_{14}$ is a constant equivalent to the mid-range value of $\theta_0$ which removes the bias introduced by controller 107 in the transmission of positive values of $\theta_0$. Analyzer recorder 95 sends signals representative of the concentrations of the light key ($L_F$) and lighter than light key ($L_{LF}$) components in the feed to the second computing zone 99. The concentration of the light key component desired in the bottom stream ($L_B$) and that desired in the side stream ($L_S$) as well as the concentration of the heavy key component desired in the distillate ($H_D$) are inserted into computing zone 99.

Computing zone 99 also receives a signal representative of the desired flow rate in the bottom stream from a third computing zone 100. Computing zone 99 solves the following equations:

$$F_{SD} = \frac{e^{-ST}}{(TS+1)^2} F_F \left[ \frac{100 - H_D - L_{LF} - L_F}{100 - H_D - \left[ \frac{L_S + L_B\left(\frac{F_B}{F_{SD}}\right)}{\frac{F_B}{F_{SD}} + 1} \right]} + (\theta_0 - K_{14})\left(1 + \frac{R_I}{F_F}\right) \right] - F_B$$

(III)

wherein $F_{SD}$ is the desired (predicted) flow rate of the sidedraw stream and $F_B$ is the desired flow rate of bottom product. The expression $e^{-ST}/(TS+1)^2$ relates to the dynamics of the process and its control system. The expression $e^{-ST}$ is defined as the time elapsing between the initiation of a change in the process and the first detection of the effect of the change upon the process as otherwise is known as dead time.

$F_{SD}$ = the desired flow rate of the sidedraw stream (volume per unit time),
T = process dead time,
S = Laplace operator,
$L_S$ = specified liquid volume fraction of light key components present in sidedraw stream,
$\theta_0$ = a value representative of the difference between the measured volume percent and the desired volume percent of the heavy key component in the overhead stream,
$F_B$ = desired flow rate of the bottoms stream (volume per unit time),
$L_B$ = specified liquid volume fraction of light key component present in bottoms product,
$R_I/F_F$ = ratio of desired internal reflux flow rate to feed flow rate,
$K_{14}$ = constant.

A method of process dead time simulation is described in Patent 3,088,664 issued to Minor W. Oglesby, Jr. and Roy T. Brashear on May 7, 1963. T is the dead time, S is the Laplace operator and $e$ is the base of natural logarithms. The term $$\frac{1}{(TS+1)^2}$$

is defined as the lag which the process exhibits in responding to a change in a material or energy input (after the dead time has expired). A method of process lag simulation is given in U.S. 3,104,810 issued to D. E. Lupfer, Sept. 24, 1963. $H_D$ is the concentration of the heavy key component desired in the distillate, $L_{LF}$ is the concentration of the lighter than light key component, and $L_F$ is the concentration of the light key component present in the feed stream.

In Equation III the term $$\left[ \frac{L_S + L_B\left(\frac{F_B}{F_{SD}}\right)}{\frac{F_B}{F_{SD}} + 1} \right]$$

is designated as $L'_s$ in Equation I, the specification of the light key concentration in the combined bottom and sidedraw streams, and a computed value thereof is transmitted from computer 99 to computer 91 for use therein. Other terms for computing an $L'_s$ such as $$L_S\left(\frac{1 + 0.4\left(\frac{F_B}{F_{SD}}\right)}{\frac{F_B}{F_{SD}} + 1}\right)$$

may be used if desired.

The output signal from the second computing zone 99 is representative of the desired flow of the side stream fluid and is transmitted by signal line 109 to flow recorder controller 69 for comparison with the measured flow rate in line 47. Flow controller 69 accordingly manipulates flow control valve 49 to maintain the proper sidedraw flow rate.

This desired sidedraw flow rate signal is also transmitted to a third computing zone 100 which computes the desired flow rate of bottom stream $F_B$. Analyzer recorder 95 transmits a signal representative of the concentration of the heavier than heavy key component in the feed ($H_{HF}$). The desired concentration of the heavier than heavy key component ($H_{HS}$) in the side stream and for the concentration of the heavier than heavy key component in the bottoms stream ($H_{HB}$) are inserted into computing zone 100. $K_{15}$ represents a periodically manually adjustable correction, whereby the computing-control accuracy may be improved on the basis of system performance. The dynamics terms are obtained similarly but of different time constant (resistance and/or capacity) values than in the $F_{SD}$ computer 99. Computing zone 100 is able to produce a signal representative of the desired flow rate in the bottoms stream by solving the following equation:

$$F_B = \frac{e^{-ST}}{(TS+1)^2} F_F \left[ \frac{H_{HF}}{\left(\frac{F_{SD}H_{HS}}{F_B H_{HB}}+1\right)H_{HF}} + K_{15} \right] \quad (IV)$$

$H_{HF}$=liquid volume fraction of heavier than heavy key component present in feed,
$H_{HS}$=specified liquid volume fraction of heavy key component in sidedraw product,
$H_{HB}$=specified liquid volume fraction of heavier than heavy key component present in bottom stream,
$K_{15}$=constant.

Computing zone 100 transmits this signal as an output signal via signal line 111 to flow recorder controller 83 where it is compared with the measured flow rate in bottom product line 43. If the desired flow rate of the bottom product is larger than the measured flow rate, flow controller 83 accordingly will increase the flow rate of the bottom product flowing in line 43 by further opening flow control valve 45. Conversely, if the desired flow rate computed in computer 100 is less than the measured flow rate, flow controller 83 will accordingly decrease the flow rate of the bottom product through line 43 by decreasing the extent to which flow control valve 45 is opened.

It is also within the scope of this invention to regulate the flow of feed in line 13. A flow recorder controller 16 is positioned to receive a signal representative of the feed flow rate from transmitter 103. This signal is compared with a signal representative of a desired flow rate and introduced into controller 16 as a set point 18. Controller 16 transmits a signal related to the difference between the measured and desired flow rates which is employed to adjust valve 15 accordingly. It is also to be understood that it is within the scope of this invention that the flow controller 16 might instead be a back pressure controller, whereby the pressure in line 13 upstream of valve 15 may be maintained at a desired level, as may be important in some applications.

It is to be understood that the automated solution of Equations I through IV may be accomplished on either a digital or analog computer, the programming of which is within the ordinary skill of the programming engineer.

It is also to be understood that the conventional measurement and control equipment previously described is available from many automatic controller manufacturers utilizing pneumatic or electrical energy or combinations of the two as the analog of the measurement and control signals. Likewise, equipment capable of performing the calculations given above is available in either pneumatic or electronic form, as desired, from several manufacturers. In most instances, complex automatic control and optimizing systems will use both pneumatic and electronic instrumentation, computation and control components to the best advantage. Measurement inputs and computing networks must be compatible in their analogies; therefore, in some cases transducers from pneumatic to electrical signals or vice versa are required to achieve operability and mathematical consistency.

To demonstarte the applicability of the invention as described hereinabove, a specific example will now be given in connection therewith. In this example, fractionator 11 is a pentane splitter from which three product streams are taken. In this example, the heavier than heavy key component comprises the total of the cyclopentane and 2,2-dimethylbutane concentrations. The heavy key component is normal pentane. The light key component is isopentane and the lighter than light key component comprises the total of the normal butane and isobutane concentrations. The feedstream, therefore, in line 13 consists of these various components and the flow rate is such that 380.510 barrels per hour are fed to the pentane splitter 11, being comprised of 0.025 bbl. of propane, 0.148 bbl. of isobutane, 0.427 bbl. of normal butane, 198.867 bbls. of isopentane, 168.568 bbls. of normal pentane, 10.665 bbls. of cyclopentane and 1.809 bbls. of 2,2-dimethylbutane. This feed is analyzed by analyzer 92 and the totalized concentration of propane, normal butane and isobutane ($L_{LF}$=0.158 liquid volume percent), and the concentration of isopentane ($L_F$=52.263 liquid volume percent) are transmitted to computing zone 91. The feed flow rate of 380.510 barrels per hour is transmitted also to computing zones 91, 99 and 100. The concentration of normal pentane desired in the distillate product ($H_D$=4.55 liquid volume percent) is inserted into computing zone 91. The various constants $K_0$ to $K_{13}$ are statistically derived for this particular column as explained hereinabove and with the difference in temperature between the overhead vapors and the external reflux, as determined by transducer 97 (35° F.), are also inserted into computing zone 91 wherein a desired, predicted, external reflux flow rate is computed, via Equations I and II, to be 1634 barrels per hour. This signal is applied as the set point to controller 89. The desired ratio of the internal reflux flow rate to the feed flow rate (5.75:1) is then transmitted from within computer 91 to a second computing zone 99 which also receives from analyzer 95 the concentration of isopentane ($L_F$) and the totalized concentrations of normal butane, isobutane and propane ($L_{LF}$) in the feed and the desired concentration of normal pentane in the distillate ($H_D$). The constant $K_{14}$, the analysis feedback signal from controller 107, the desired bottom flow rate $F_B$ from computer 100 and the desired concentrations of isopentane in each the bottom ($L_B$=4.85 liquid volume percent) and the side stream ($L_S$=12.45 liquid volume percent) are further inserted into this computer and it computes via Equation III the desired sidedraw flow rate to be 186.86 barrels per hour, of which the cyclopentane comprises 8.61 bbls., the 2,2-dimethylbutane 1.43 bbls., the normal pentane 153.56 bbls., and the isopentane 23.26 bbls., passing through line 47. This desired flow rate is applied as the set point to controller 69. In the third computing zone 100, the sidedraw flow rate of 186.86 barrels per hour is fed as an input. The totalized concentration of 2,2-dimethylbutane and cyclopentane present in the feed ($H_{HF}$=3.278 liquid volume percent) is fed in as an input and the totalized concentrations of 2,2-dimethylbutane and cyclopentane desired in the sidedraw ($H_{HS}$=5.37 liquid volume percent) as well as in the bottom ($H_{HB}$=25.54 liquid volume percent) and constant $K_{15}$ are inserted into computing zone 100 and it solves, via Equation IV, for a desired flow rate of bottom product of 9.54 barrels per hour, which comprises 0.377 bbl. 2,2-dimethylbutane, 2.058 bbls. of cyclopentane, 6.638 bbls. of normal pentane and 0.463 bbl. of isopentane. This desired flow rate is applied as the set point of controller 83.

As the result of these several control actions, principally those of the feed flow controller 16, the three computed and applied set points to controllers 89, 69 and 83, and level controllers 77 and 63, the overhead product is removed by controller 63 at a rate of 184.1 barrels per hour comprised of propane 0.025 bbl./hr., isobutane 0.148 bbl./hr., normal butane 0.427 bbl./hr., isopentane 175.145 bbls./hr., and normal pentane 8.372 bbls./hr.

Thus it can be seen that by utilizing (1) measurements of the composition and flow rate of feed, (2) the desired concentration values of the critical components in the various product streams and (3) the several mathematical models based on theoretical fractionation calculations as well as empirically correlated equations, and by exchanging certain computed values among the three computers, that a predictive control system may be constructed and applied to a fractional distillation operation and may be coordinated in a dynamic sense therewith to produce much improved control of a three-product separation system. This "feed-forward" control system is supplemented by a corrective, "feed-back," control system based on overhead product analysis so as to make minor corrections to take into account the effects of variables not considered in the mathematical models, and the minor changes in the constants and coefficients of the equations.

Obviously, many modifications and variations of the present invention are possible in the light of the above teachings. It is therefore to be understood that within the scope of the appended claims the invention may be practiced otherwise than as specifically described herein.

We claim:

1. In a process wherein a multi-component feed stream is separated in a fractional distillation column into an overhead vapor stream, at least one liquid sidedraw product stream, and a liquid bottom product stream, said overhead stream being condensed with a first portion of the resulting condensate being recycled to said column as an external reflux stream and with a second portion of said condensate being yielded as an overhead product stream, wherein all said product streams have specified component concentrations therein; an improved method for controlling said fractional distillation column comprising the steps of measuring the flow rate of said feed stream and establishing a first measurement signal representative thereof; measuring the concentrations of feed components in said feed stream and establishing a plurality of second measurement signals representative thereof; combining said first measurement signal and respective ones of said plurality of second measurement signals in each of three interrelated mathematical models in a computing zone; establishing reference signals representative of the desired composition specifications of said overhead product stream, said sidedraw product stream and said bottom product stream; applying each of said reference signals to an input of at least one of said three interrelated mathematical models; applying an output signal from each of said three interrelated mathematical models as an input to at least one of the remaining ones of said three interrelated mathematical models; the first mathematical model having a first output signal representative of the ratio of the predicted internal reflux flow rate of said column to the measured feed flow rate to said column, the second mathematical model having a second output signal representative of the flow rate of said sidedraw product stream required to obtain a sidedraw stream of specified purity, the third mathematical model having a third output signal representative of the flow rate of said bottom product stream required to obtain a bottom product of specified purity; and manipulating the flow rates of said external reflux stream, said sidedraw product stream and said bottom product stream responsive to said first, second and third output signals, respectively, to obtain the specified purities in each of said product streams.

2. A method in accordance with claim 1 further comprising analyzing said overhead vapor stream and establishing a third measurement signal representative of the concentration of at least one component thereof, comparing said third measurement signal with a signal representing the desired concentration of said at least one component in said overhead vapor stream and establishing a fourth output signal representative of the difference obtained by the resulting comparison, and applying said fourth output signal as a feedback signal to an input of said second model.

3. A method in accordance with claim 2 wherein said second mathematical model can be represented by the following equation:

$$F_{SD} = \frac{e^{-ST}}{(TS+1)^2} F_F \left[ \frac{100 - H_D - L_{LF} - L_F}{100 - H_D - \left[ \frac{L_S + L_B\left(\frac{F_B}{F_{SD}}\right)}{\frac{F_B}{F_{SD}} + 1} \right]} + (\theta_0 - K_{14})\left(1 + \frac{R_I}{F_F}\right) \right] - F_B$$

wherein:

$F_{SD}$ = the predicted required flow rate of the sidedraw product stream (volume per unit time),
$T$ = process dead time,
$S$ = Laplace operator,
$e$ = natural base logarithm,
$F_F$ = feed flow rate (volume per unit time), measured,
$H_D$ = the specified liquid volume fraction of heavy key component in overhead product stream,
$L_{LF}$ = measured liquid volume fraction of lighter than light key component in feed stream,
$L_F$ = the measured liquid volume fraction of the light key component in the feed stream,
$R_I$ = predicted internal reflux flow rate (volume per unit time),
$L_S$ = specified liquid volume fraction of light key components present in sidedraw product stream,
$\theta_0$ = a value representative of the difference between the measured volume percent and the desired volume percent of the heavy key component in the overhead product stream,
$F_B$ = desired flow rate of the bottom product stream (volume per unit time),
$L_B$ = specified liquid volume fraction of light key component present in bottom product stream,
$R_I/F_F$ = ratio of desired internal reflux flow rate to feed flow rate,
$K_{14}$ = constant.

4. A method in accordance with claim 3 wherein said first mathematical model can be represented by the following equation:

$$\frac{R_I}{F_F} = K_0 + K_1 L_{LF} + L_F[K_2 + K_3 e^{K_4 L'_S} + K_6 e^{K_7 H_D} + K_5(L_F)] + K_8 e^{K_4 L'_S} + K_9 e^{K_7 H_D} + K_{10} e^{K_7 H_D} e^{K_4 L'_S} + K_{11}(R_I) + K_{12}(R_I)^2$$

wherein:

$K_0 - K_{12}$ = statistically desired constants $$L'_s = \left[ \frac{L_s + L_B\left(\frac{F_B}{F_{SD}}\right)}{\frac{F_B}{F_{SD}} + 1} \right]$$

5. A method in accordance with claim 4 wherein said third mathematical model can be represented by the following equation:

$$F_B = \frac{e^{-sT}}{(TS+1)^2} F_F \left[ \frac{H_{HF}}{\left(\frac{F_{SD}H_{HS}}{F_B H_{HB}}\right) H_{HB}} + K_{15} \right]$$

wherein:

$H_{HF}$=measured liquid volume fraction of heavier than heavy key component present in feed stream,
$H_{HS}$=specified liquid volume fraction of heavy key component in sidedraw product stream,
$H_{HB}$=specified liquid volume fraction of heavier than heavy key component present in bottom product stream,
$K_{15}$=constant.

6. A method in accordance with claim 5 wherein said feed stream comprises a mixture of isopentane, normal pentane, cyclopentane, n-butane, isobutane, and 2,2-dimethylbutane, wherein the heavy feed component ($H_F$) is normal pentane, the heavier than heavy feed component ($H_{HF}$) is the summation of cyclopentane and 2,2-dimethylbutane and the light feed key component ($L_F$) is isopentane and the lighter than light feed component ($L_{LF}$) is normal butane and isobutane.

7. Apparatus comprising a fractional distillation column; first conduit means for passing a multi-component feed stream into said fractional distillation column; a condenser; an accumulator, second conduit means for passing at least a portion of the vapor from the upper portion of said first distillation column through said condenser for at least partial condensation thereof and into said accumulator; third conduit means communicating between said accumulator and an upper portion of said first distillation column to pass a first portion of the condensate from said accumulator into said first distillation column as reflux therefor; fourth conduit means communicating with said accumulator for withdrawing a second portion of said condensate from said accumulator as an overhead product stream; fifth conduit means connected to an intermediate section of said first distillation column for withdrawing a sidedraw product stream therefrom; sixth conduit means connected to a lower portion of said first distillation column for withdrawing a bottom product stream therefrom; first, second and third computing means; means for measuring the flow rate of said feed stream through said first conduit means and applying a signal representative of the flow measurement to an input of each of said first, second and third computing means; means for analyzing said feed stream and applying signals representative of the concentration of selected components in said feed stream to respective inputs of said first, second, and third computing means; means for applying to respective inputs of said first, second and third computing means signals representative of the desired composition of said overhead product stream, said sidedraw product stream and said bottom product stream; means for applying an output of said first computing means to an input of said second computing means; means for applying an output of said second computing means to an input of said third computing means; means for applying an output of said third computing means to an input of said second computing means; means for applying an output of said second computing means to an input of said first computing means; said first computing means being adapted to produce a first output signal representative of the ratio of the predicted internal reflux flow rate of said fractional distillation column to the measured feed flow rate through said first conduit means; said second computing means being adapted to produce a second output signal representative of the flow rate of said sidedraw product stream through said fifth conduit means to obtain a sidedraw product stream of specified purity; said third computing means being adapted to produce a third output signal representative of the flow rate of said bottom product stream through said sixth conduit means required to obtain a bottom product stream of specified purity; means for controlling the flow rate of reflux through said third conduit means as a function of said output signal; means for controlling the flow rate of said sidedraw product stream through said fifth conduit means responsive to said second output signal, and means for controlling the flow rate of said bottom product stream through said sixth conduit means responsive to said third output signal; to thereby obtain an overhead product stream, a sidedraw product stream and a bottom product stream of specified purity.

8. Apparatus in accordance with claim 7 further comprising an analyzer controller for measuring the concentration of at least one component of the fluid passing through said second conduit means and establishing a fourth output signal representative of the difference between the thus measured concentration and the desired concentration; and means for applying said fourth output signal to an input of said second computing means.

9. Apparatus in accordance with claim 8 wherein said second computing means determines said second output signal in accordance with the following equation:

$$F_{SD} = \frac{e^{-sT}}{(TS+1)^2} F_F \left[ \frac{100 - H_D - L_{LF} - L_F}{100 - H_D - \left[ \frac{L_S + L_B \frac{F_B}{F_{SD}}}{\frac{F_B}{F_{SD}} + 1} \right]} + (\theta_0 - K_{14})\left(1 + \frac{R_I}{F_F}\right) \right] - F_B$$

wherein:

$F_{SD}$=the predicted required flow rate of the sidedraw product stream (volume per unit time),
T=process dead time,
S=Laplace operator,
E=natural base logarithm,
$F_F$=feed flow rate (volume per unit time), measured,
$H_D$=the specified liquid volume fraction of heavy key component in overhead product stream,
$L_{LF}$=measured liquid volume fraction of lighter than light key component in feed stream,
$L_F$=the measured liquid volume fraction of the light key component in the feed stream,
$R_I$=predicted internal reflux flow rate (volume per unit time),
$L_S$=specified liquid volume fraction of light key components present in sidedraw product stream,
$\theta_0$=a value representative of the difference between the measured volume percent and the desired volume percent of the heavy key component in the overhead product stream,
$F_B$=desired flow rate of the bottom product stream (volume per unit time),
$L_B$=specified liquid volume fraction of light key component present in bottom product stream,
$R_I/F_F$=ratio of desired internal reflux flow rate to feed flow rate,
$K_{14}$=constant.

10. Apparatus in accordance with claim 9 wherein said first computing means determines said first output signal in accordance with the following equation:

$$\frac{R_I}{F_F} = K_0 + K_1 L_{LF} + L_F[K_2 + K_3 e^{K_4 L's} + K_6 e^{K_7 H_D} + K_5(L_F)] + K_8 e^{K_4 L's} + K_9 e^{K_7 H_D} + K_{10} e^{K_7 H_D} e^{K_4 L's} + K_{11}(R_I) + K_{12}(R_I)^2$$

wherein:

$K_0 - K_{12}$ = statistically desired constants $$L'_s = \left[ \frac{L_s + L_B \left( \frac{F_B}{F_{SD}} \right)}{\frac{F_B}{F_{SD}} + 1} \right]$$

and wherein said third computing means determines said third output signal in accordance with the following equation:

$$F_B = \frac{e^{-ST}}{(TS+1)^2} F_F \left[ \frac{H_{HF}}{\left( \frac{F_{SD} H_{HS}}{F_B H_{HB}} + 1 \right) H_{HB}} + K_{15} \right]$$

wherein:

$H_{HF}$ = measured liquid volume fraction of heavier than heavy key component present in feed stream,
$H_{HS}$ = specified liquid volume fraction of heavy key component in sidedraw product stream,
$H_{HB}$ = specified liquid volume fraction of heavier than heavy key component present in bottom product stream,
$K_{15}$ = constant.

References Cited

UNITED STATES PATENTS

| | | | |
|---|---|---|---|
| 3,224,947 | 12/1965 | Lupfer | 196—132 |
| 3,294,648 | 12/1966 | Lupfer et al. | 203—2 |
| 3,296,097 | 1/1967 | Lupfer | 203—2 |
| 3,296,241 | 1/1967 | Berger | 202—160 |

OTHER REFERENCES

A Predictive Control System for Distillation Columns: Lupfer et al., Chemical Engineering Prog. (vol. 58, No. 9), September 1962, pp. 37–42.

WILBUR L. BASCOMB, JR., Primary Examiner.

U.S. Cl. X.R.

196—132; 202—160; 203—3, 99, 2; 235—151.12

UNITED STATES PATENT OFFICE

CERTIFICATE OF CORRECTION

Patent No. 3,428,528                           Dated: February 18, 1969

Minor W. Oglesby, Jr. and Robert M. Keeler

It is certified that error appears in the above-identified patent and that said Letters Patent are hereby corrected as shown below:

Column 13, beginning at line 3, that portion of the equation reading $$\frac{F_{SD}H_{HS}}{F_B H_{HB}}$$ should read $$\frac{F_{SD}H_{HS} + 1}{F_B H_{HB}}$$

Column 14, line 3, before "output", insert -- first --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents